United States Patent
Simon et al.

(10) Patent No.: US 6,442,270 B1
(45) Date of Patent: Aug. 27, 2002

(54) TELEPHONE NUMBER LOOKUP WITH REDUCED SCROLLING

(75) Inventors: Daniel Simon, San Diego; Stephen A. Sprigg, Poway; Clarence C. Wong, Encinitas, all of CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/449,193

(22) Filed: Nov. 24, 1999

(51) Int. Cl.[7] .................................................. H04M 1/27
(52) U.S. Cl. .............................. 379/355.09; 379/355.1
(58) Field of Search ........................... 379/88.01, 88.03, 379/355.09, 355.1

(56) References Cited

U.S. PATENT DOCUMENTS 5,452,340 A * 9/1995 Engelbeck et al. ............ 379/67
5,677,949 A * 10/1997 Macor ......................... 379/354

FOREIGN PATENT DOCUMENTS

| EP | 0920168 | * | 11/1998 |
| EP | 0915604 | * | 5/1999 |
| GB | WO 99 09729 | * | 2/1999 |
| WO | WO 99/23805 | * | 5/1999 |

* cited by examiner

Primary Examiner—Scott L. Weaver
(74) Attorney, Agent, or Firm—Philip R. Wadsworth; Charles D. Brown; Howard Seo

(57) ABSTRACT

A telephone (202) includes a microphone (204), earphone (206), keypad (208), and display unit (210). The keypad (208) is the preferred user interface for entry of a telephone number into the telephone so that the telephone may call it. However, a voice recognition device (212) may be attached to the microphone with similar effect. The telephone includes a list (214) of stored telephone numbers, which may be added onto the list in any convenient way. As digits are entered into the phone through the user interface (208, 212), a comparator (216) compares the resulting partially entered number with the numbers on the list. When the comparison demonstrates some pre-established association between the numbers, then the stored number is displayed on the display unit (210). If the user selects (310) one of the displayed numbers (perhaps with scrolling), the number is called (312). If not, the next digit is entered.

14 Claims, 2 Drawing Sheets

| 102 | 104 | |
|---|---|---|
| 4 | 418-3402 JOHN SMITH<br>419-1072 SAM JONES<br>437-2113 GEORGE BROWN | 106 |
| 41 | 418-3402 JOHN SMITH<br>419-1072 SAM JONES | 108 |
| 419 | 419-1072 SAM JONES | 110 |

100

TELEPHONE NUMBER LOOKUP WITH REDUCED SCROLLING

TECHNICAL FIELD

This invention relates to telephony, and has particular relation to looking up and calling telephone numbers which have been stored in a telephone or associated device.

BACKGROUND ART

A telephone may store a reasonably large number of numbers. The telephone's user may be away from a paper telephone book, or even a personal address book. This is particularly true for wireless telephones. This feature prevents the number from being lost or forgotten.

Conventionally, each number is associated with the name of the person to be called. These names are listed in some convenient order, generally alphabetical. The telephone user scrolls through the names, selects the one he wants, and presses the send button. It is unnecessary to manually enter the exact number on the keypad. Having the number built into the telephone (or some associated device, such as a Personal Digital Assistant) thus makes it faster to call the number as well as making the number resistant to being lost or forgotten.

BRIEF DISCLOSURE OF THE INVENTION

Applicants have noted that the very popularity of this feature has become its downfall. It is relatively cheap and convenient to place quite a lot of memory on the telephone, which allows quite a long list of numbers to be stored in the telephone. This great length makes it inconvenient for the user to scroll through the entire list.

Applicants have therefore reversed the conventional technology. Applicants do not attempt to avoid manual use of the keypad. Instead, Applicants exploit such manual use to reduce the length of the list, and use scrolling on the reduced list. Indeed, the list is often reduced to a single entry, thereby allowing scrolling to be entirely avoided.

As each digit of the phone number is entered, the resultant partially entered phone number is compared with the numbers. A display shows only those numbers which match (in some sense) the partially entered number. When the desired number is shown (perhaps with the aid of some additional scrolling), the user selects it, and the number is called.

DETAILED DESCRIPTION

Figures 1, 2:
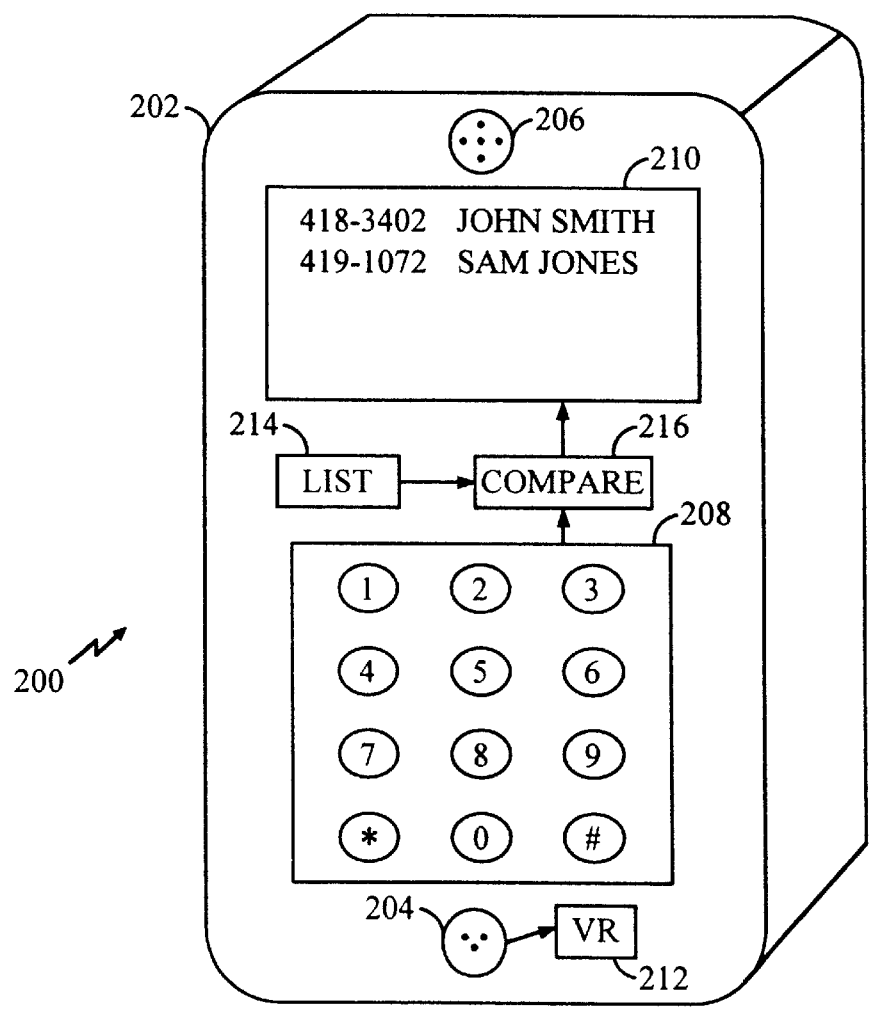
FIG. 1 is a matrix showing an example of partially entered numbers and resulting stored numbers.
FIG. 2 is a partially schematic, and partially perspective, view of a telephone according to the present invention.

FIG. 1 is a matrix (100) showing an example of partially entered numbers and resulting stored numbers. The left column (102) shows the sequence of digits which form a partially entered telephone number. The right column (104) shows the stored numbers which match the partially entered telephone number. After the first digit has been entered (106), there are three possible stored numbers. With the entry of each succeeding digit (108, 110), the number of possible stored numbers is reduced, until there is only one. This number may be called, as by pressing a "Call" button, or in any other convenient way. Alternatively, such conventional methods may be used as touching the display unit where one of the several numbers are displayed, even when more than one number is displayed. Scrolling may also be used, and will be considerably reduced from the amount of scrolling required in the absence of the present invention.

FIG. 1 shows the "stored telephone number" as including both the telephone number as such and the name of the person with that number, and this is preferred. However, the phrase "stored telephone number" also includes either the number or name without the other. It further includes any other identifier or identifiers which the user may find convenient in designating what telephone number to call.

FIG. 2 is a partially schematic, and partially perspective, view (200) of a telephone (202) according to the present invention. The telephone includes a microphone (204), earphone (206), keypad (208), and display unit (210). The keypad (208) is the preferred user interface for entry of a telephone number into the telephone so that the telephone may call it. However, a voice recognition device (212) may be attached to the microphone with similar effect.

The telephone includes a list (214) of stored telephone numbers. The numbers may be added onto the list in any convenient way. The list is considered to be included in the telephone if it is included in an associated Personal Digital Assistant (PDA) or other associated device.

As digits are entered into the phone through the user interface (208, 212), a comparator (216) compares the resulting partially entered number with the numbers on the list. When the comparison demonstrates some pre-established association between the stored number and the partially entered number, then the stored number is displayed on the display unit (210).

The most convenient association is an association between the partially entered telephone number and a sequence of digits, of equal length, at the beginning of the stored telephone number. However, the association may be with any sequence of digits, of any length and at any position in the stored number. Indeed, it may even be with a code associated with the stored telephone number. Such codes are preferably abbreviations of the name of the person to be called. Other associations will occur to those having skill in the art.

Figure 3:
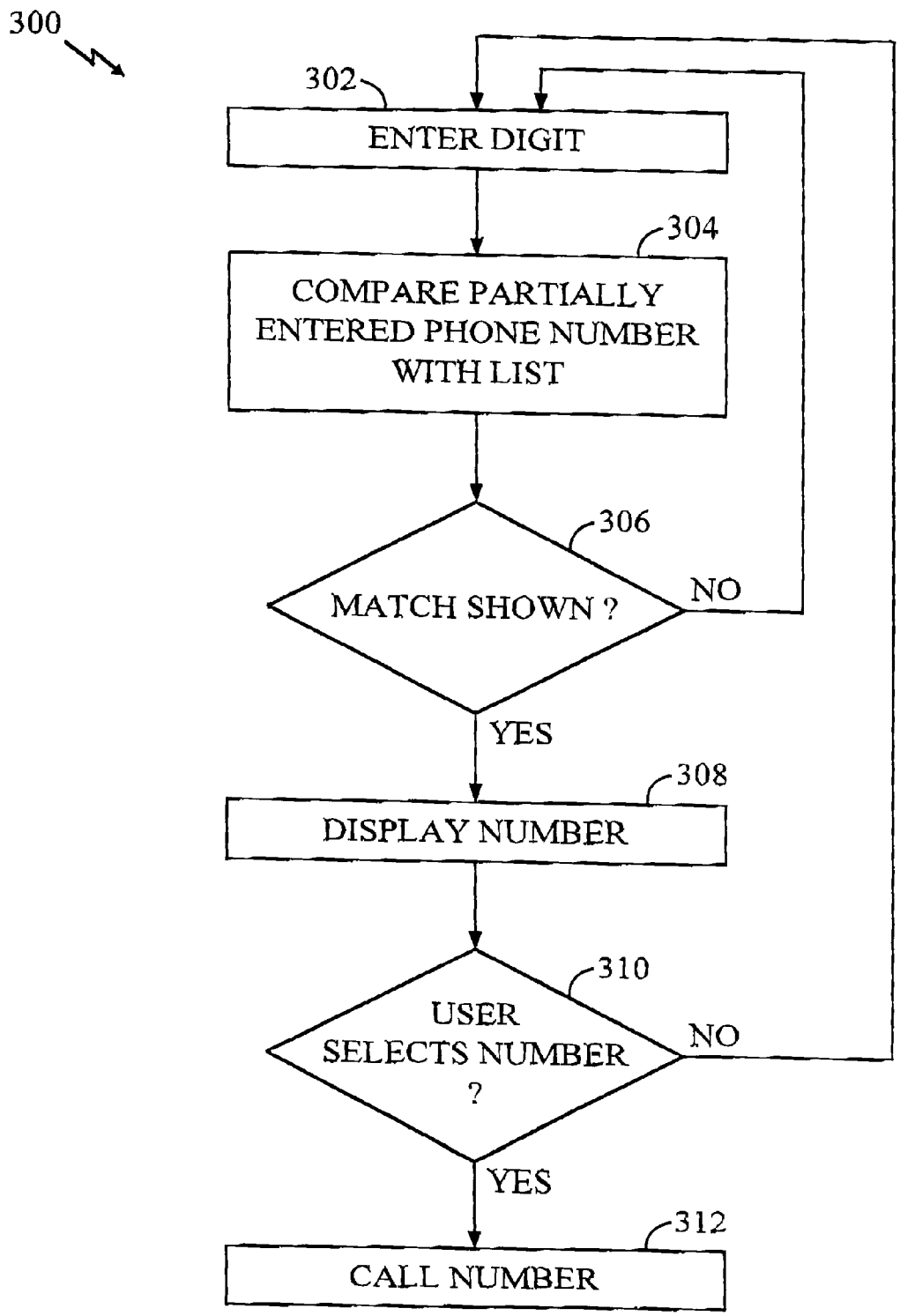
FIG. 3 is a flowchart of a method according to the present invention.

FIG. 3 is a flowchart (300) of a method according to the present invention. A digit is entered (302), and the resulting partially entered telephone numbered is compared with the list of stored telephone numbers (304). If a match (306) is shown (that is, if the comparison demonstrates an association as described above), then the number is displayed (308), perhaps with some scrolling. If the user selects (310) one of the displayed numbers, the number is called (312). If not, the next digit is entered.

INDUSTRIAL APPLICATION

Our invention is capable of exploitation in industry, and can be made and used, whenever is it desired to speed up the automatic lookup of a telephone number by reducing or eliminating scrolling. The individual components of the apparatus and method shown herein, taken separate and apart from one another, may be entirely conventional, it being their combination which we claim as our invention.

While we have described various preferred embodiments and modes of apparatus and method, the true spirit and scope of our invention are not limited thereto, but are limited only by the following claims and their equivalents, and we claim such as our invention.

What is claimed is:

1. A telephone wherein:

the telephone includes:

a user interface adapted to entry, by the user, of a telephone number to be called;

a list of stored telephone numbers;

means for displaying the stored telephone numbers to the user;

means for the user to select one of the displayed telephone numbers;

means for calling the selected number;

the telephone further includes means for comparing a partially entered telephone number with the list of stored telephone numbers; and the display means is constructed to display only those stored telephone numbers for which the comparison demonstrates some pre-established association between the stored telephone number and the partially entered telephone number, wherein the display means displays every stored telephone number that demonstrates the pre-established association and updates the displayed telephone numbers when the user enters a new additional digit for the partially entered telephone number.

2. The telephone of claim 1, wherein the user interface includes a keypad (208).

3. The telephone of claim 1, wherein the user interface includes a voice recognition device (212).

4. The telephone of claim 1, wherein the pre-established association includes an association between the partially entered telephone number and any sequence of digits at any position in the stored telephone number.

5. The telephone of claim 4, wherein the pre-established association includes an association between the partially entered telephone number and a sequence of digits, of equal length, at the beginning of the stored telephone number.

6. The telephone of claim 1, wherein the pre-established association includes an association between the partially entered telephone number and a code associated with the stored telephone number.

7. The telephone of claim 6, wherein the code associated with the stored telephone number includes an abbreviation of a name of a person to be called.

8. A method for placing a telephone call on a telephone, wherein:

the telephone includes:

a user interface adapted to entry by the user, of a telephone number to be called; and a list of stored telephone numbers;

the method includes:

comparing a partially entered telephone number with the list of stored telephone numbers;

displaying every stored telephone number that demonstrates some pre-established association between the stored telephone number and the partially entered telephone number; and updating the displayed telephone numbers when the user enters a new additional digit for the partially entered telephone number.

9. The method of claim 8, wherein the user interface includes a keypad (208).

10. The method of claim 8, wherein the user interface includes a voice recognition device (212).

11. The method of claim 8, wherein the pre-established association includes an association between the partially entered telephone number and any sequence of digits at any position in the stored telephone number.

12. The method of claim 11, wherein the pre-established association includes an association between the partially entered telephone number and a sequence of digits, of equal length, at the beginning of the stored telephone number.

13. The method of claim 8, wherein the pre-established association includes an association between the partially entered telephone number and a code associated with the stored telephone number.

14. The method of claim 13, wherein the code associated with the stored telephone number includes an abbreviation of a name of a person to be called.

* * * * *